Patented Oct. 11, 1938

2,132,435

UNITED STATES PATENT OFFICE 2,132,435

AGING DISTILLED ALCOHOLIC SPIRITS

Clarence K. Reiman, Newton, Mass., assignor to R. G. N. Development Corporation, Boston, Mass., a corporation of Massachusetts No Drawing. Application June 6, 1934, Serial No. 729,229

10 Claims. (Cl. 99—48)

This invention relates to the aging of distilled alcoholic spirits or liquors and its object is to reduce the time which has hitherto been required for converting the raw products of the distillery into smooth, fragrant, palatable liquor. Primarily, the invention consists in a method of accelerating the rate of the identical reactions which occur in liquor which is aged in accordance with the time honored process in charred oak casks. More specifically, it consists in an improved process for extracting soluble materials from charred wood, of partially oxidizing the unsaturated bodies present in the extract and in the distillate and in causing rapid esterification of some of the alcohol and acid components, all of these steps being carried out in an independently controlled manner.

In putting into practice the process of my invention, I endeavor to bring about the whole series of reactions necessary to produce what is known as aged whiskey, rum, brandy and the like, whether describing aroma and flavor or the product and process, and to accelerate the aging process so that, not only the well understood reactions take place at an accelerated rate, but that all the side reactions as well may proceed. At the outset, it may be stated that the process of my invention should not be confused with the so-called aging processes hitherto attempted, which are actually little more than purification processes for removing from the raw distillate the bulk of materials, other than ethyl alcohol and water, and then contacting with an excessive amount of wood chips, to obtain color and frequently a woody-bitter taste from this wood. The difference between these "purification processes" and the improved aging process of my invention will be pointed out in detail hereinafter.

I am well aware that certain processes of accelerating aging are currently practiced in the art. These, however, are limited to raising the temperature of the warehouse or the barrel, or its contents, to about 100° F., with a practical top limit of about 135° F. Sometimes these processes include the addition of air, oxygen or ozone, or an equivalent treatment with ultraviolet light rays, so as to accomplish a certain degree of oxidation. At such elevated temperatures and in contact with the charred surface of the barrel, the rate of esterification and oxidation is somewhat accelerated. These known processes, however, are of limited use for two reasons; first, because little is accomplished in the way of time saving, since months are still required and costs are high, and, second, because quality is seriously impaired due to the acrid, peppery taste and flavor which are always extracted from unleached wood or charred wood by hot alcohol solutions.

In the raw distillate, besides ethyl alcohol and water, there are present other alcohols, such as propyls, butyls, amyls, hexlys, and more complex alcohols, and a variety of acids, such as acetic, formic, butyric, propionic, caprylic, caproic, etc., none of which are pleasant or desirable in any considerable quantity in a finished potable liquor but all of which, after esterification, add to the flavor of the finished aged product. These impurities, with the addition of a further quantity of acetic and other acids, tannins, color and phenolic compounds which are extracted from the char and charred wood of the cask in which the product is normally aged, are the very things that account for the aroma and flavor of the aged liquor. They are available for this purpose, if, after partial oxidation, they are allowed to react and produce a very large number of compounds, called esters,—the result of the chemical combination of an alcohol and an acid. The esters are largely the basis of the aroma and flavor of the aged liquor.

In the raw distillate, there are some impurities which cannot be directly esterified, such as aldehydes, ketones and other unsaturated bodies, and these are in part responsible for the "raw" taste of freshly distilled liquors. In the charred cask, over a period of years, these bodies are in part oxidized into almost inert materials or to acids which later esterify with the alcohols. These products should not be left unchanged in the potable liquor, not only because of their unpleasant taste but also because they produce unpleasant physiological effects when imbibed.

The color of whiskey and other liquors aged in charred casks comes from the wood extract leached out into the liquor together with the tannins and certain products from the distillation of the wood, which accompanies the charring process. Sometimes caramellized sugar is added for the purpose of producing a darker color.

These several reactions,—leaching, oxidation and esterification—occur slowly through the years when aging is accomplished in the charred wooden cask. The oxidation is accomplished by the oxygen of the air which is always present in the cask. The leaching effect is readily to be understood. The esterification effect in the cask is accelerated by the wood char comprising its inner surface and would occur at a very much slower rate in a glass carboy, for example.

Char acts as a catalyst because it has a very great surface, and of the surface effects the chief is adsorption of materials with which the char is in contact in relatively high concentration on its surface. The adsorbed materials are each in high concentration on the charred surface, that is, there is almost as much normal amyl alcohol, for example, adsorbed per unit of surface on this char as there would be if there were no other alcohols or acids present in the distillate. Thus there are high concentrations of each of the reacting materials to form the large number of esters present in close association with each other. This concentration at the char surface is many times higher than is the concentration of the reacting materials in the bulk of the distillate in the cask. The rate of reaction increases directly as the concentration, and this is the reason that esterification proceeds faster in a charred cask than in a glass container. For example, as soon as a certain amount of normal amyl acetate is formed on the surface of the char from the normal amyl alcohol and acetic acid originally adsorbed, and has thereby used up a certain amount of the amyl alcohol and acetic acid that was adsorbed on the char, two things happen. First, more amyl alcohol and acetic acid are adsorbed, and then a certain amount of the amyl acetate leaves the char and dissolves in the distillate. There always tends to be an equilibrium between the adsorbed material and the concentration left in the distillate, and these reacting materials and the products of these reactions are continually moving from the solution to the char, and vice versa, endeavoring to maintain equilibrium.

There are two distinct equilibria concerned in these reactions, and my invention is primarily concerned wth abruptly changing the conditions of these equilibria for the purpose of increasing the rate of the several reactions taking place. It is not the purpose of this invention to bring about new and different reactions, but to increase the rate of the reactions that normally occur over a long period during aging in charred white oak casks, since by definition whiskey, for example, is a proper distillate in which these reactions have taken place. The first equilibrium concerns the distribution of the several components of the distillate between the surface of the char and the solution. The actual concentration of any one of these components adsorbed on the surface of the char bears a definite relation to the concentration of this component left in the solution, for any given temperature, provided agitation is maintained, so that a free interchange between the surface of the char and all parts of the solution may at all times take place. If nothing happened beyond this effect, equilibrium would quickly be established, and the need of continued agitation would cease. However, the second equilibrium, which is a reversible reaction and is even more important than the first, disturbs the first equilibrium by reducing the concentration of the reacting materials on the surface of the char, and this makes necessary continual agitation.

The second equilibrium is a reversible reaction and may be expressed by the general chemical equation:—

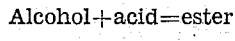
Alcohol+acid=ester and although the reaction at all times is actually proceeding in both directions, it eventually proceeds more completely in the direction to the right since, under the conditions of normal aging or under the conditions of my accelerated process, the ester is the more stable product.

It is a well-known fact that analyses of whiskeys, for example, aged in charred casks for four or more years, still have present aldehydes, fusel oils, and unesterified acids. Such analyses differ from similar analyses made on the raw spirits, before aging, chiefly by the largely increased amount of total esters, or rather by the higher ester-acid ratio in the product.

In order to accelerate the rate of this chemical reaction and so arrive at the point where this reaction, involving all of the many possible ester combinations, has proceeded almost completely to the right, I raise the temperature of the reacting materials to near, at or above the boiling point, since it is well understood that a chemical reaction approximately doubles its rate for each 10° C. rise in temperature.

In carrying out my invention, since it is impracticable thus to heat spirits to such temperatures in a wooden cask, I prefer to place the raw distillate in a metal or glass lined container and to admix therewith a proper amount of a surface catalyst such as finely divided char. A reflux condenser may be attached to the container and heat applied in order to maintain the contents at or near the boiling point and without loss of any of the product. If it is desired to keep the temperature below the boiling point, the product should be subjected to mechanical stirring. If the product is maintained at the boiling point, sufficient agitation occurs without stirring. In some cases it is desirable to maintain the product at a temperature above the boiling point and, therefore, under more than atmospheric pressure, and under these conditions a mechanical stirrer should preferably be used.

In the practice of my invention, I have found it desirable to treat a product somewhat overproof, that is, higher than 50 per cent alcohol, since the aging reactions proceed at an increased rate at the higher concentrations. Since a distillate having 60 to 75 per cent alcohol is easier to treat than one having 50 per cent or less, it is generally desirable to carry on some fractionation in the conventional fractionating tower in order to attain optimum conditions. On the contrary, if all the higher alcohols and acids are removed from the distillate by too excellent fractionation, it will be impossible to produce an aged liquor of high bouquet and flavor. Too much of the higher alcohols called fusel oils are not desirable since these higher alcohols produce physiological effects when taken internally that are deleterious, although, if esterified and not present in too great concentration, they are useful in producing a highly flavored and aromatic product. The desired content of the higher alcohols can be readily determined by one skilled in the art by adjusting the amount of reflux at the top of the column. The same result can be approximated with the old-fashioned "pot still", a still with a condenser directly attached, although the product of such distillation will run as low as 35 per cent in alcohol unless it is re-run.

When wood or partially charred wood or any char made from wood by distillation is present during the refluxing period of esterification, or at any time when alcohol solutions are near the boiling point, a peppery taste may be developed in the product which is, no doubt, due to the phenolic material which the hot liquor extracts from the wood and from the partially charred wood and char containing some of the products from the distillation of the wood. I have discovered a method of avoiding the development of this peppery taste when using as a catalyst a finely divided char made from wood and to that end may proceed in the following manner. I leach out the soluble materials desired from the wood, the char and charred wood by placing the raw distillate in a charred cask for a short period, either cold or at a warm room temperature, and allowing it to stand for a few days, or carry out the equivalent step by agitating the raw distillate with partially charred chips or flowing the distillate over a column of such chips. Subsequently, I add carefully prepared fine char from white oak, or an equivalent catalyst of high adsorptive power, to the distillate, after separating the new colored product from all wood and partially charred wood by efficient filtration or the equivalent. I then partially oxidize the unstable and easily oxidized materials by aerating or blowing air through the distillate or by some equivalent operation. This may be effected in a period of perhaps 24 hours or less, and later this same char may serve as an esterification catalyst. The oxygen of the air adsorbed on the char surface rapidly oxidizes the unsaturated materials also adsorbed on the char surface. Then I reflux the material with the fine char. This permits the substantial esterification of all acidic components extracted from the wood and of all reactable materials from the distillate after each has been oxidized to a stable condition and without the presence of wood or charred wood from which any solutes could be extracted by the hot or boiling liquor. Thus any rawness from extractives is removed and aged along with the components of the distillate and no peppery flavor is produced.

The preferred catalyst of highly absorptive power is preferably finely divided char from white oak barrel staves or the equivalent, but in any case it is used after all extractives have been removed by a pre-treatment at boiling point with either a small part of the liquor to be treated or a 40 to 60 per cent alcohol solution. The char is filtered out and is ready for use at once. The alcohol or liquor used hot to extract the char is recovered by distillation for reuse. These hot extractives should not be added to the finished liquor. This procedure will permit the refluxing of the liquor with the surface catalyst without any of the materials to which the peppery taste is due being present, since these undesirable peppery and woody extractives have been removed from the wood char by the hot or boiling alcohol solution.

The terms charred wood or partially charred wood or toasted chips are used herein preferably to designate white oak, that has been heated until some blackening or darkening takes place. The inside of a charred barrel, for example, can be considered as having several layers; the heavily charred first layer which actually is char, but which contains in a new barrel a considerable quantity of tars and other materials from the distillation of the wood, and collectively known as "pyroligneous acid"; the layers just under this char consisting of charred and partially charred wood—it is not char or charcoal, but partially decomposed or partially distilled or partially charred wood; under this layer, the rest of the stave is of substantially unchanged wood. Thus, when raw spirits are placed in a new barrel, the pyroligneous acid from the char is quickly extracted into the spirits, and more slowly the color and flavor-forming materials from the partially charred wood and even from the uncharred wood of the deeper layers is also dissolved by the spirits.

The acid content from these several layers is relatively high, and these acids, after esterification with the alcohols of the distillate, are very important factors in producing the final flavor— both as regards quantity and character. The toasted chips (of white oak) widely used in the industry today, are often made by the manufacturer of the barrels from the waste wood, and after reducing to thin chips about ¼ inch in size, they are baked or otherwise raised in temperature, until partial charring takes place. It is attempted to char them so that the extract obtained from them will be approximately the same as that obtained by the raw spirits from a new barrel.

Thus, throughout this specification, when I mention toasted chips or partially charred wood, I refer to materials of this class from which in a short time can be extracted materials similar to those extracted by the same spirits from a new charred barrel.

When I refer to char, I mean a surface catalyst which absorbs on its surface certain of the dissolved materials in the solution (of spirits, in this specification), and from which I do not desire to obtain extractives, and from which in most cases I have found it absolutely necessary to remove all extractives before using the catalyst for the purpose disclosed.

Every commercial char that I have used, and all chars that I have made by charring oak chips, for example, have had present enough extractable material so that if used without first boiling with an alcohol solution to remove these extractives, the final whiskey or other distilled spirits, after the refluxing or esterification step, will be peppery and almost unpotable. I have found it is impossible to maintain hot or boiling alcoholic solutions in contact with wood or partially charred wood, or with fresh char (that is, char that has not been at least once used, or which has not been previously extracted by boiling alcoholic solutions) without producing this peppery taste which renders the whiskey, for example, unpotable. As stated elsewhere in the specification, that is the reason that whiskey in a barrel cannot be heated with safety above, say 100° F. for any considerable time, and can be heated to the top limit of safety in a barrel, about 125° F., for only a matter of a few hours.

Following the esterification step, if additional color is desired, the liquor may be placed in a charred cask for a period of hours or days, depending on the temperature. The product may then be given a second mild aeration treatment or may be passed over an electro violet light source in the liquor or vapor state or otherwise treated to oxidize any unsaturated components picked up from the charred wood.

As an alternate oxidation step, I have found that a small amount of air or other oxidizing gas forced under gentle pressure into the body of the distillate while it is being heated with the char or other surface catalyst under the reflux condenser will rapidly oxidize the unsaturated materials. Thus the oxidation and esterification steps may be taken practically simultaneously, although care must be used not to pass too much air through the reaction chamber since some of the volatile flavors may be removed despite the presence of an efficient reflux condenser.

As one specific example of the practice of my invention, I have taken raw whiskey distillate made from corn from a simple pot still without a fractionating tower, obtained from a distillery in the Kentucky district and which had been kept for about two months in a charred oak cask. This distillate had extracted a medium dark whiskey color and some flavoring materials from the cask and had a mild "top" aroma but a very strong unpleasant raw "bottom" flavor. One pint of this distillate placed in a flask with 5 cc. of hydrogen peroxide (30 vol. per cent) and 0.5 gram of fine char from a white oak whiskey barrel stave after the char had been extracted by boiling with 60 per cent alcohol and subsequently filtered. A reflux condenser was attached to the flask and the product gently heated and then boiled, and therefore agitated, for 16 hours. After cooling and removing the char by filtration, the product was slightly browner in color, with a very rich top aroma and entirely without the original raw bottom taste. The treated product compared favorably with excellent Bourbon whiskey aged by conventional methods.

As a second specific example of putting my invention into practice, I have taken the raw white whiskey distillate from a rye 65 per cent and corn and malt 35 per cent mash, obtained the day it was distilled and having almost no top aroma and a very raw bottom taste, and subjected it to the following treatment. This distillate had been over well fractionated so that the raw product was low in impurities. Fine, partially charred oak wood was shaken with the raw distillate for 2 hours at room temperature—2 grams of partially charred oak chips to one pint of the distillate produced an adequate color of wood extract.

After filtering, one-half gram of fine extracted oak char was added and air was sucked through the distillate at frequent intervals for a period of 16 hours. Then the distillate, with the same fine char, was gently boiled under a reflux condenser for 30 hours and finally cooled and filtered. The result was a well colored, lightly flavored rye whiskey without any of the raw or bottom flavor. On reboiling with the surface catalyst of fine wood char as above for 24 hours longer, no increase in flavor was noted. The product was completely aged but such a highly fractionated whiskey distillate as was the original product could never produce a full bodied rye whiskey on account of the original over fractionation to which it has been subjected.

I have also found that these rapidly aged products are somewhat further improved, if after the accelerated treatment, they are placed as of old in charred oak cask for a period, which may range in point of time from a few days to many months, depending on the nature of the raw material used and of the finished product desired.

I have treated in a similar manner a whole series of raw alcoholic distillates and in all cases have entirely removed the raw odor and taste in from 15 to 48 hours refluxing with the surface catalyst and the addition of a very small amount of air, and have in all cases produced a pleasing high aroma in the treated product. This has been the result with raw rum made from molasses and from lighter stocks, such as refinery syrups and cane juice, and from various brandies distilled from wines, cider, berry and cherry juices and the like. The invention is much broader than its application to whiskey aging, and in general is applicable to aging any distilled alcoholic liquor, in which exist, as distilled, the impurities, which when properly oxidized and esterified, will produce the flavor, aroma and taste characteristic of the aged and finished product in question. This process will not produce such a characteristic flavor from alcohol and water, for example, nor from so-called raw distillates which have been too highly fractionated or too well purified by other means, such as percolating through a bed of fine activated char. Such purification processes in which raw whiskey or other alcoholic distillate is contacted with large quantities of char—often a bushel of char per gallon of whiskey—are widely used in the production of neutral spirits and in the partial purification of poorly fractionated whiskeys, for example, when it is desired to remove all or certain of the impurities from the distillate. Any char used in the manner or for this purpose has a definite adsorptive capacity and cannot be used over and over. Moreover any char added to any alcoholic distillate will tend to so remove a certain amount of the so-called impurities. As has been frequently pointed out in this specification, I do not desire to remove any of these impurities, but since the amount removed is measurable I use a very small amount of the especially prepared char as catalyst, and use the same char over and over, so that the small amount of impurities adsorbed from the first lot so treated is the only amount lost. Moreover, as shown in my two examples, the amount of char necessary as a catalyst is very small, compared to that required for a filtration-by-percolation process— ½ gram per pint or 4 grams per gallon which is 6 or 7 ounces per barrel, instead of a bushel per barrel. Moreover, in a commercial unit treating hundreds of barrels at a time, and with mechanical agitation, the amount required would be proportionately less. In general, the richness of flavor and the desirable body of the finished aged product is proportional to the amount of 'impurities" left in the distillate take from the still, although many distillers today are continuing to produce a very pure distillate so that the time required for aging may be reduced. Such distillates will produce at best, regardless of the time that they are left in charred casks, finished products of low bouquet and flavor.

Finally, it may be stated that this process, accurately applied in the laboratory, may well be used as a method of assaying the value of a given raw distillate, and will show with surprising accuracy just how excellent a product will be produced by normal aging over a period of years.

Having thus described my invention, what I claim as new and desire to secure by Letters Patent is:

1. The process of aging distilled alcoholic spirits, which consists in accelerating the rate of the esterification reactions between the several acids and alcohols occurring therein, by maintaining the raw distillate being treated at a temperature near its boiling point in the presence of finely divided wood char from which all extractives soluble in boiling alcohol solutions have been completely leached.

2. In the process of aging raw distilled alcoholic spirits, the steps of first separating the char from all traces of wood or partially charred wood, and then leaching the thus mechanically-purified char with a boiling alcohol solution, and then initially contacting the distillate with the char so prepared at near the boiling point of the distillate for a period of hours.

3. In the process of aging raw distilled alcoholic spirits, the steps of first separating the char from all traces of wood or partially charred wood, and then leaching the thus mechanically-purified char with a boiling alcohol solution, and then initially contacting the distillate with the char so prepared at near the boiling point of the distillate for a period of hours, and then storing for a period of weeks in charred barrels.

4. The process of accelerating the aging of distilled alcoholic spirits, characterized by the step of maintaining the liquid distillate at an elevated temperature, in substantially closed inorganic containers so that volatile materials are prevented from leaving the container, with agitation, in the presence of finely divided wood char from which all extractives soluble in boiling alcohol solutions have been extracted, and slowly passing a current of air through the distillate.

5. The process of aging distilled alcoholic spirits, which is characterized by the steps of first coloring the distillate by contacting with partially charred wood, then completely removing all undissolved solids from the distillate, then maintaining the colored and partially oxidized distillate with agitation at near its boiling point in the presence of finely divided completely alcohol-extracted wood char thus accelerating the rate of esterification of the several alcohols and acids present in said distillate.

6. In a process for aging raw distilled alcoholic spirits, the step of increasing the rate of esterification of the several acids and several alcohols present in such distillates after color and certain acidic extractives have been added to the distillate by contacting with partially charred wood, by maintaining the distillate at near the boiling point in the presence of a surface catalyst of high adsorptive power composed substantially of extracted char from which all extractives soluble in boiling alcohol solutions have been removed for a period of hours, and kept during this heating period out of contact with any uncharred wood or partially charred wood product.

7. In a process of aging raw distilled alcoholic spirits, the steps of increasing the rate of esterification of the several acids and several alcohols present in such distillates after color and certain acidic extractives have been added to the distillate by contacting with partially charred wood, by maintaining the distillate at near the boiling point in the presence of completely alcohol-leached char for a period of hours, and kept during this heating period out of contact with any uncharred wood or partially charred wood product, and simultaneously forcing through the body of the distillate at a very slow rate a gas containing a gaseous compound composed of atoms of oxygen, partially to oxidize the unstable compounds present in the distillate and in the extract from the charred wood.

8. The process of aging raw distilled alcoholic spirits, containing as distilled, besides ethyl alcohol and water, various organic acids, higher alcohols, and unstable and easily oxidized materials, which is characterized by the steps of first contacting the raw whiskey at a relatively low temperature with partially charred finely divided oak wood, so as to impart color and flavor-forming materials to the raw whiskey, second, completely separating the colored whiskey from all traces of woody solids, third, adding an inert finely divided completely extracted surface catalyst composed substantially of carbon, and finally maintaining the whiskey for a period of hours at approximately its boiling point in the presence of small quantities of air.

9. The process of aging distilled alcoholic spirits, which consists in accelerating the rate of the esterification reaction between the several acids and alcohols therein, by locally increasing the concentration of these reacting materials on the surface of a catalyst of high adsorptive power, under conditions such that all solid woody materials in contact with the boiling distillate have been previously extracted with a boiling alcoholic solution, thus removing all substances originally present in such solid woody materials which are soluble in hot alcoholic solutions and maintaining the temperature of the product being treated near its boiling point for a period of hours.

10. The process of aging distilled alcoholic spirits which consists in accelerating the rate of the esterification reaction between the several acids and alcohols therein, by locally increasing the concentration of these reacting materials on the surface of a small amount of a surface catalyst of high adsorptive power, under conditions such that all solid woody materials in contact with the distillate have been previously extracted with a boiling alcoholic solution so that all such solid woody materials are substantially free from ingredients soluble in hot alcoholic solutions, and maintaining the temperature of the product being treated near its boiling point for a period of hours, and then storing for a period of weeks in charred barrels.

CLARENCE K. REIMAN.